(12) United States Patent
Carraher et al.

(10) Patent No.: US 8,126,993 B2
(45) Date of Patent: Feb. 28, 2012

(54) SYSTEM, METHOD, AND COMPUTER PROGRAM PRODUCT FOR COMMUNICATING SUB-DEVICE STATE INFORMATION

(75) Inventors: Terrence John Carraher, Fremont, CA (US); Herbert O. Ledebohm, Georgetown, TX (US)

(73) Assignee: NVIDIA Corporation, Santa Clara, CA (US)

( * ) Notice: Subject to any disclaimer, the term of this patent is extended or adjusted under 35 U.S.C. 154(b) by 849 days.

(21) Appl. No.: 11/489,352

(22) Filed: Jul. 18, 2006

(65) Prior Publication Data

US 2008/0021989 A1      Jan. 24, 2008

(51) Int. Cl.
*G06F 15/173* (2006.01)
*G06F 15/16* (2006.01)
(52) U.S. Cl. ......... 709/223; 709/217; 709/224; 709/225
(58) Field of Classification Search .......... 709/217–219, 709/223–229
See application file for complete search history.

(56) References Cited

U.S. PATENT DOCUMENTS 5,586,268 A * 12/1996 Chen et al. .................. 710/38
(Continued)

FOREIGN PATENT DOCUMENTS

JP            10240700 A      9/1998
(Continued)

OTHER PUBLICATIONS

U.S. Appl. No. 10/990,712, filed on Nov. 17, 2004.
(Continued)

*Primary Examiner* — Bharat Barot
(74) *Attorney, Agent, or Firm* — Zilka-Kotab, PC

(57) ABSTRACT

A system, method, and computer program product are provided for communicating sub-device state information. In use, a plurality of sub-devices of a device is exposed to an application, utilizing a driver. A request may then be received from the application for state information associated with at least one of the sub-devices. In response to the request, the state information is provided to the application.

27 Claims, 5 Drawing Sheets

U.S. PATENT DOCUMENTS

| | | | |
|---|---|---|---|
| 5,832,222 A * | 11/1998 | Dziadosz et al. | 709/217 |
| 6,904,477 B2 * | 6/2005 | Padmanabhan et al. | 710/74 |
| 6,919,896 B2 | 7/2005 | Sasaki et al. | |
| 7,016,949 B1 * | 3/2006 | Tagawa | 709/223 |
| 7,113,290 B2 * | 9/2006 | Sakamoto | 358/1.1 |
| 7,171,671 B2 * | 1/2007 | Snead et al. | 719/321 |
| 7,383,412 B1 * | 6/2008 | Diard | 711/170 |
| 7,477,256 B1 | 1/2009 | Johnson | |
| 7,546,369 B2 * | 6/2009 | Berg | 709/227 |
| 7,885,940 B2 * | 2/2011 | Hegde et al. | 709/223 |
| 7,890,636 B2 * | 2/2011 | Grayson et al. | 709/218 |
| 2002/0173344 A1 | 11/2002 | Cupps et al. | |
| 2004/0030415 A1 * | 2/2004 | Lee | 700/19 |
| 2006/0066896 A1 | 3/2006 | Tsuchiya et al. | |
| 2006/0087576 A1 | 4/2006 | Izawa et al. | |
| 2006/0274073 A1 | 12/2006 | Johnson et al. | |
| 2008/0020753 A1 | 1/2008 | Glass et al. | |

FOREIGN PATENT DOCUMENTS

| | | | |
|---|---|---|---|
| JP | 2000259145 A | 9/2000 | |
| JP | 2002182799 A | 6/2002 | |
| JP | 2005004478 A | 1/2005 | |
| JP | 2005066942 A | 3/2005 | |
| JP | 2005241806 A | 9/2005 | |
| WO | 0247080 A2 | 6/2002 | |
| WO | 0247081 A2 | 6/2002 | |

OTHER PUBLICATIONS

Chinese Office Action Summary from Chinese Application No. 2007101 30378.3 issued on Mar. 13, 2009.

U.S. Appl. No. 10/992,276, filed on Nov. 17, 2004.

U.S. Appl. No. 10/991,540, filed on Nov. 17, 2004.

U.S. Appl. No. 11/305,701, filed on Dec. 16, 2005.

Notice of Final Rejection from Japanese Patent Application No. 2007-187376, dated Jul. 20, 2010.

Notice of Reasons for Rejection from Japanese Patent Application No. 2007-187376, dated Mar. 23, 2010.

Notice of Preliminary Rejection from Korean Patent Application No. 10-2007-71813, dated May 29, 2009.

Office Action from Taiwan Patent Application No. 096126215, dated Oct. 12, 2010.

Office Action from Chinese Patent Application No. 200710130378.3 dated Jul. 5, 2011.

Office Action from Chinese Patent Application No. 200710130378.3, dated Nov. 1, 2011.

* cited by examiner

SYSTEM, METHOD, AND COMPUTER PROGRAM PRODUCT FOR COMMUNICATING SUB-DEVICE STATE INFORMATION

FIELD OF THE INVENTION

The present invention relates to resource management, and more particularly to obtaining state information from various resources.

BACKGROUND

Prior art FIG. 1 illustrates a system 100 for managing a plurality of graphics processors, in accordance with the prior art. As shown, a pair of applications 102, 104 are included which deliver requests for completion of various graphics processing tasks. Typically, such applications 102, 104 are only capable of issuing requests to a single graphics processor. In other words, such applications 102, 104 are configured such that they assume that only one graphics processor exists.

In more recent systems like the system 100 shown, however, at least a pair of graphic processors 108, 110 is provided for carrying out the various graphics processor tasks. In order to provide interoperability among the multiple graphic processors 108, 110 and the single processor-equipped applications 102, 104, a driver 106 is typically utilized. Specifically, the driver 106 provides an interface among the components such that the task requests issued by the applications 102, 104 may be divided among the different graphic processors 108, 110. To this end, the applications 102, 104 do not see the graphic processors 108, 110 discreetly, but rather see them as a single device 112, thus complying with the protocol of their task requests, etc.

Unfortunately, operation of drivers of the type mentioned above precludes applications (particularly those that are equipped to work with multiple graphics processors) from querying such graphics processors individually. There is thus a need for overcoming these and/or other problems associated with the prior art.

SUMMARY

A system, method, and computer program product are provided for communicating sub-device state information, utilizing a driver. In use, a plurality of sub-devices of a device is exposed to an application. A request may then be received from the application for state information associated with at least one of the sub-devices. In response to the request, the state information is provided to the application.

BRIEF DESCRIPTION OF THE DRAWINGS

Prior art

DETAILED DESCRIPTION

Figure 2:
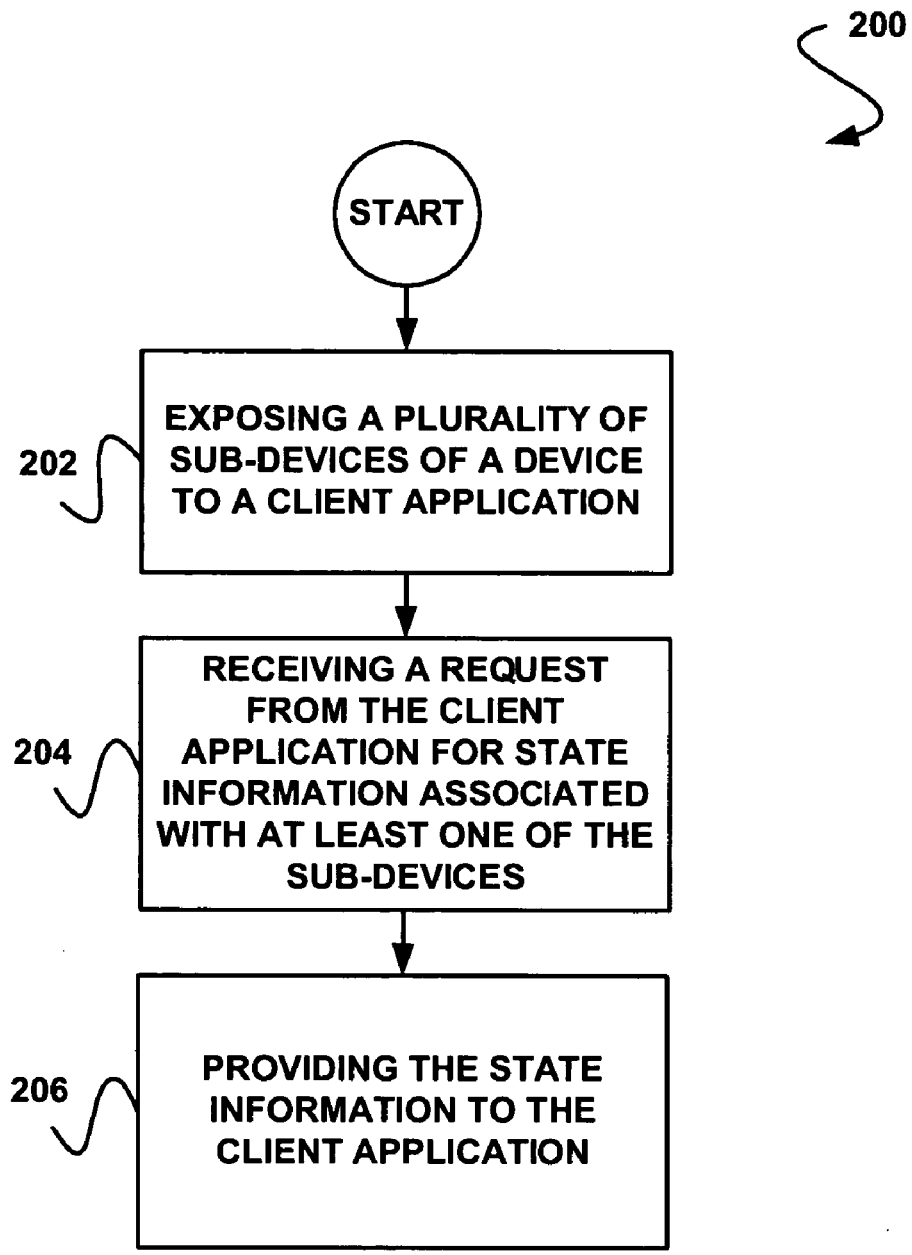
FIG. 2 shows a method for communicating sub-device state information, in accordance with one embodiment.

FIG. 2 shows a method 200 for communicating sub-device state information, in accordance with one embodiment. As shown, a plurality of sub-devices of a device is exposed to an application, utilizing a driver. See operation 202.

In the context of the present description, such sub-devices may each include any device implemented on at least one semiconductor platform in the form of a semiconductor-based integrated circuit or chip. Further, the aforementioned sub-devices are associated in the form of a device such that the application perceives such association while, at the same time, is exposed to the distinct nature thereof.

Of course, the aforementioned application may refer to any software and/or hardware that is capable of utilizing the sub-devices. Further, the driver refers to any software capable of providing an interface between the application, and the sub-device and sub-devices. Even still, the sub-devices may be exposed in any manner that supports the remaining operations to be discussed hereinafter.

In one optional embodiment, such sub-devices may include separate graphics processors. As a further option, such sub-devices may include distinct graphics processing units (GPUs). More information regarding such embodiment will be set forth in greater detail during reference to FIG. 3 et al. Of course, the sub-devices may each refer to any device that meets the definition set forth hereinabove.

By virtue of the exposure of operation 202, a request may then be received from the application for state information associated with at least one of the sub-devices. See operation 204. In the context of the present description, the state information may refer to performance information, temperature information, power information, and/or any information relating to a state of the particular sub-device.

In response to the request of operation 204, the state information is provided to the application. See operation 206. As an option, such request may be received by the aforementioned driver which, in turn, provides the requested state information in accordance with operation 206.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
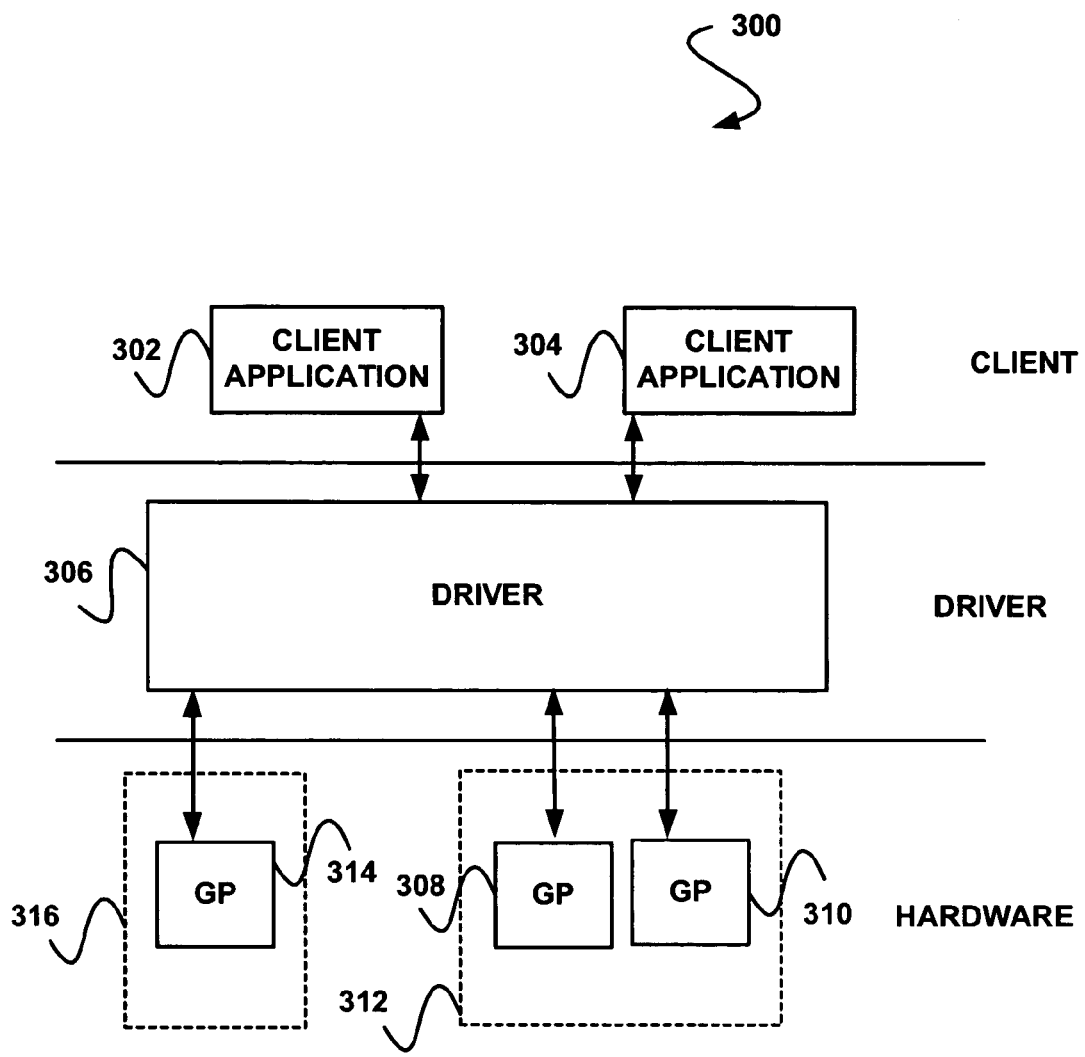
FIG. 3 illustrates a system for communicating sub-device state information, in accordance with one embodiment.

FIG. 3 illustrates a system 300 for communicating sub-device state information, in accordance with one embodiment. As an option, the present system 300 may be the subject of the method 200 of FIG. 2. Of course, however, the system 300 may be used in any desired environment. Still yet, the above definitions apply during the following description.

Figure 1:
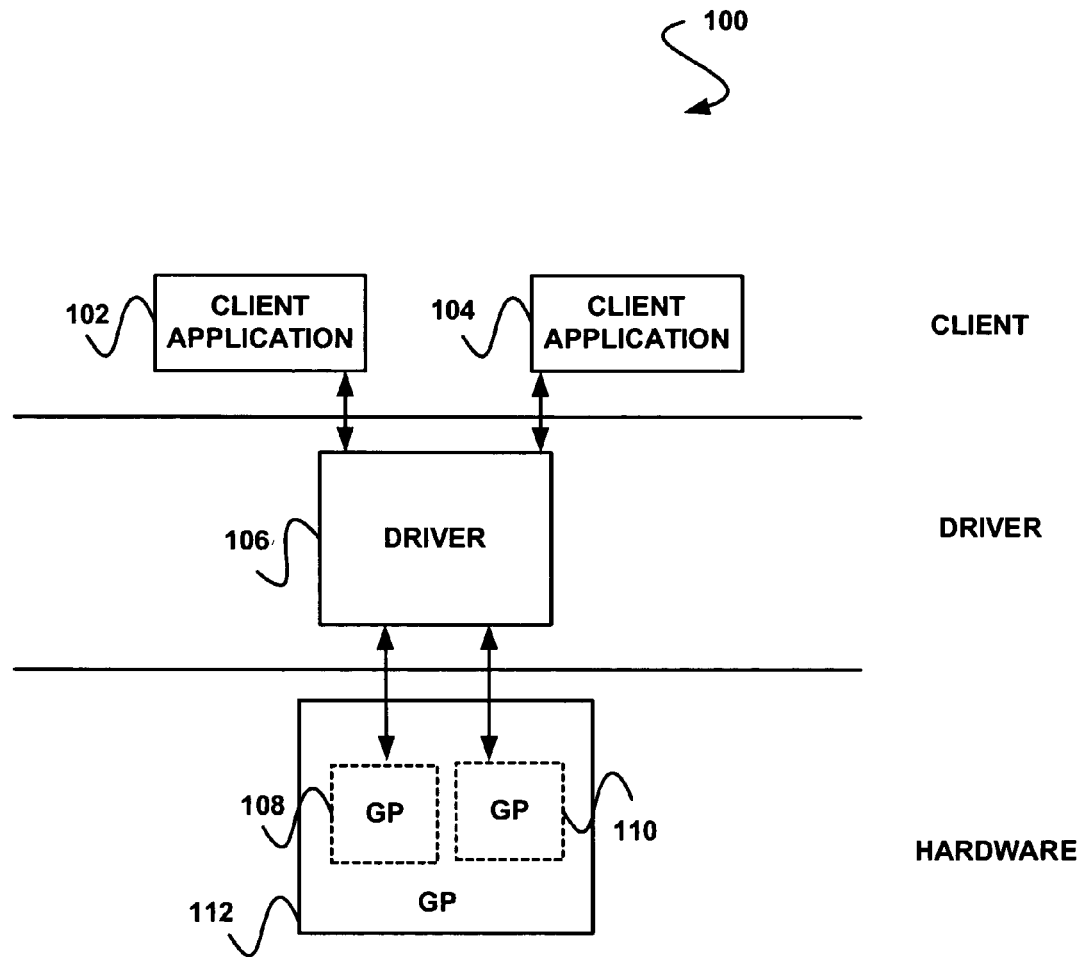
FIG. 1 illustrates a system for managing a plurality of graphics processors, in accordance with the prior art.

As shown, a pair of applications 302, 304 are included which issue requests for completion of various processing tasks. Unlike the prior art system 100 of FIG. 1, such applications 302, 304 are capable of issuing requests to a device including a plurality sub-devices, as well as the sub-devices individually. To this end, such applications 302, 304 are configured to recognize separate devices 312, 316 each including one or more sub-devices 308, 310, and 314, as well as the sub-devices 308, 310, and 314 themselves. As shown in FIG. 3, such sub-devices 308, 310, and 314 may each include a separate graphics processor.

To accommodate such capability of the applications 302, 304, a driver 306 is included for exposing not only the devices 312, 316, but also the sub-devices 308, 310, and 314. To this end, the applications 302, 304 may issue requests with respect to the graphic processors 308, 310 discreetly, as well as the associated single device 312, depending on a mode of operation.

Specifically, the sub-devices 308, 310, and 314 are capable of operating in a first mode where a first sub-device 308 serves as a slave to a second sub-device 310. An example of such master-slave operation will be set forth in greater detail during reference to FIG. 5. In one embodiment, such first mode of operation may be carried out in accordance with NVIDIA® SLI™ technology. More information regarding such technology may be found by reference to an application filed Nov. 17, 2004 under application Ser. No. 10/990,712, which is incorporated herein by reference in its entirety.

Still yet, the sub-devices 308, 310, and 314 are capable of operating in a second mode where the first sub-device 308 and the second sub-device 310 operate independently. For example, such independent operation may be carried out without the master-slave operation, etc.

Thus, in use, the state information for the sub-devices 308, 310, and 314 may be provided to the applications 302, 304 independent of whether the sub-devices 308, 310, and 314 are operating in the first mode and the second mode. In other words, such sub-device state information may be accessed whether or not the system 300 is operating in the first or second mode. In the context of an embodiment where the first mode includes the foregoing NVIDIA® SLI™ technology, such technology need not necessarily be disabled for accessing the sub-device state information.

It should also be noted that, in the case of the device 316 and sub-device 314, the device 316 includes a single sub-device 314. To this end, in some embodiments, any state information of the device 316 is the same as that of the sub-device 314. Thus, in such embodiments, any request for state information in association with the device 316 would provide such information about the sub-device 314, and visa-versa.

In other embodiments where the device 316 includes a single sub-device 314, a query to the device 316 may possibly yield different results with respect to a query to the sub-device 314. Also, in still other embodiments, a request to the device 316 may be valid, while that same request may be invalid for the sub-device 314. Just by way of example, such may be the case in situations where the device 316 includes a fan and/or power device(s) that can be queried, while the sub-device 314 does not.

Figure 4:
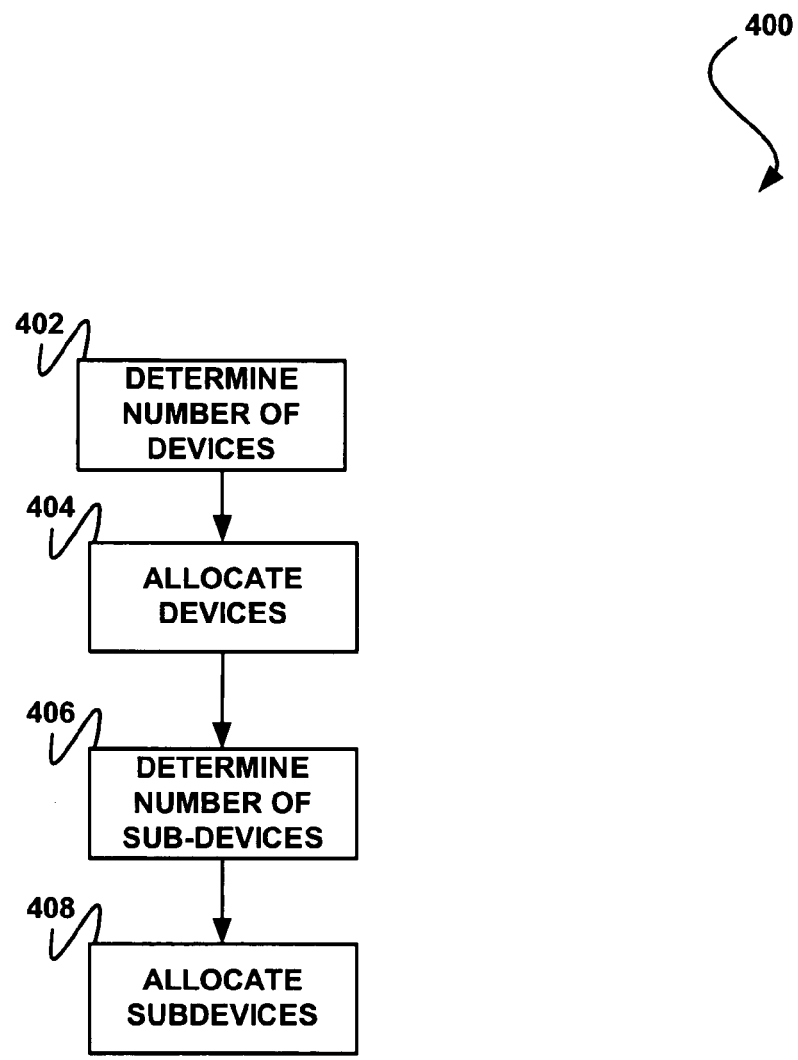
FIG. 4 shows a method for identifying a plurality of devices and sub-devices, in accordance with another embodiment.

FIG. 4 shows a method 400 for identifying a plurality of devices and sub-devices, in accordance with another embodiment. As an option, the present method 400 may be implemented in the context of the system 300 of FIG. 3, and the method 200 of FIG. 2. Of course, however, the method 400 may be implemented in any desired environment. Again, the definitions introduced hereinabove apply during the following description.

As shown, a number of devices (e.g. see, for example, the devices 312, 316 of FIG. 3, etc.) is determined in operation 402. Specifically, in response to a request by an application (e.g. see, for example, the applications 302, 304 of FIG. 3, etc.), a number of devices may be identified by a driver (e.g. see, for example, the driver 306 of FIG. 3, etc.) and further exposed (e.g. communicated, etc.) to the requesting application.

To this end, the requesting application may allocate such devices by determining any identifier associated therewith, etc. See operation 404. Such identifiers may be used for the purpose of referencing the same when making requests (e.g. for state information, etc.) thereafter.

Similarly, a number of sub-devices (e.g. see, for example, the sub-devices 308, 310, and 314 of FIG. 3, etc.) is determined in operation 406. Again, in response to a request by an application, a number of sub-devices may be identified by the driver and further exposed to the requesting application. Thus, the requesting application may allocate such sub-devices by determining any identifier associated therewith, etc. See operation 408. Again, such identifiers may be used for the purpose of referencing the same when making requests (e.g. for state information, etc.) thereafter.

Table 1 illustrates an exemplary result of the allocation of operations 404 and 408.

TABLE 1

| |
|---|
| Device_1 |
|     Sub-Device_A |
|     Sub-Device_B |
| Device_2 |
|     Sub-Device_C |
|     Sub-Device_D |
|     Sub-Device_E |
| Device_3 |
|     Sub-Device_F |

Of course, such allocation is set forth for illustrative purposes only and should not be construed as limiting in any manner.

Figure 5:
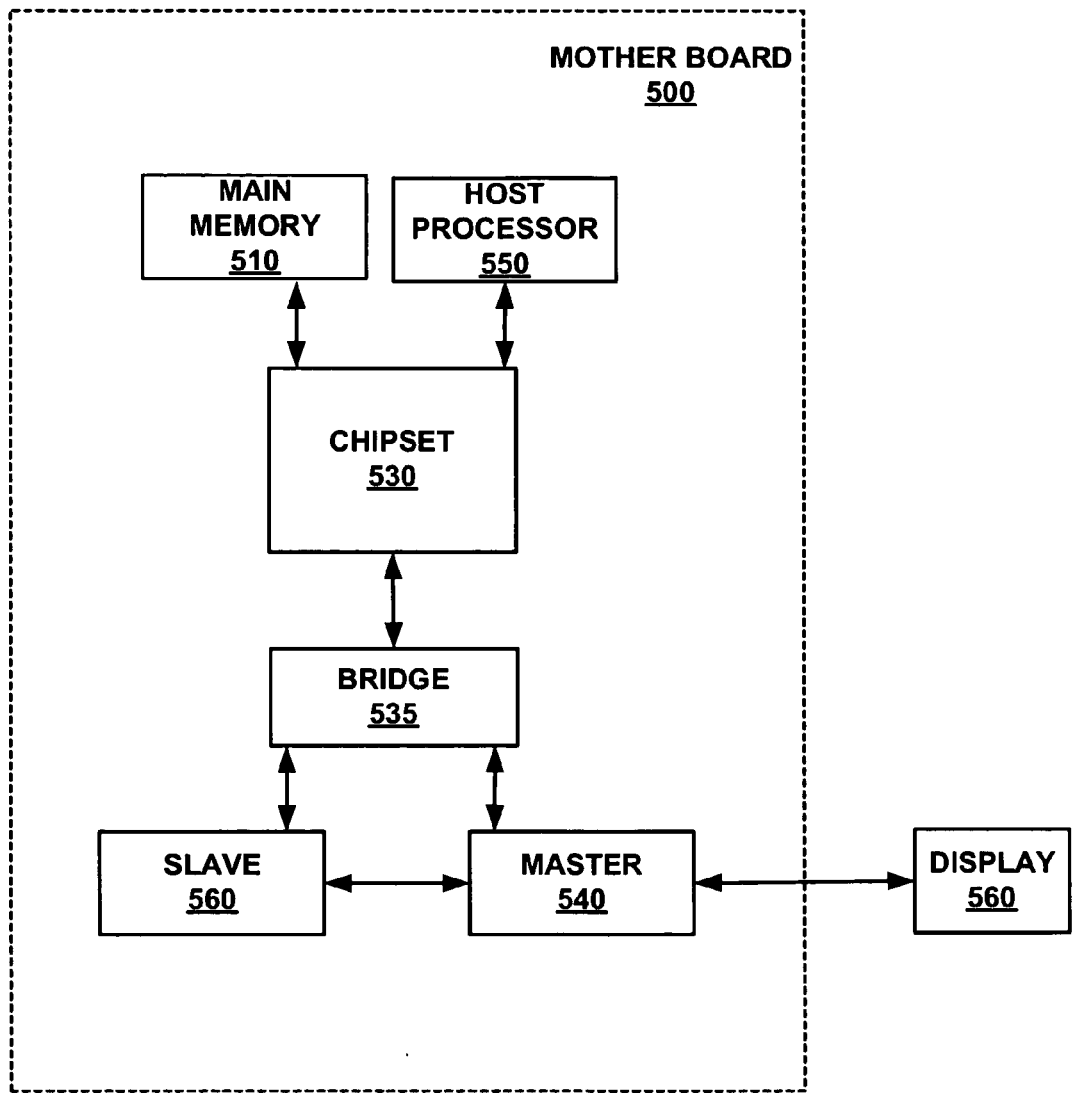
FIG. 5 is a block diagram of an exemplary embodiment of a motherboard for a multi-processor graphics processing system.

FIG. 5 is a block diagram of an exemplary embodiment of a motherboard for a multi-processor graphics processing system 500, in accordance with another embodiment. As an option, the present system 500 may be the subject of the methods/systems of FIGS. 2-4. Of course, however, the system 500 may be used in any desired environment. Still yet, the above definitions apply during the following description.

While not shown, a motherboard 500 may be included within a desktop computer, server, laptop computer, palm-sized computer, tablet computer, game console, cellular telephone, computer based simulator, or the like. The motherboard 500 includes a host processor 550, a main memory 510, and a chipset 530 that is directly coupled to a bridge 535.

In some embodiments of the motherboard 500, a chipset 530 may include a system memory bridge and an input/output (I/O) bridge that may include several interfaces such as, Advanced Technology Attachment (ATA) bus, Universal Serial Bus (USB), Peripheral component interface (PCI), or the like. The bridge 535 provides an interface between the chipset 530 and a master graphics adapter 540 and a slave graphics adapter 560.

It should be noted that such master graphics adapter 540 and slave graphics adapter 560 (and possibly even the one or more graphics processors that make up the same) may each constitute an example of the aforementioned sub-device, in the context of the present embodiment. Again, such embodiment should not be construed as limiting in any manner, as any sub-device may be utilized that meets the definition set forth earlier.

In some embodiments, interfaces 541 and 545 conform to an industry standard interface specification, such as peripheral component interface express (PCI-Express™). Furthermore, in one embodiment, the functionality of the bridge 535 is included within the chipset 530. In another embodiment, the bridge 535 is omitted and chipset 530 interfaces directly with the master graphics adapter 540 and slave graphics adapter 560.

The master graphics adapter 540 may take the form of a printed circuit board (PCB) which is coupled to connection 545 when installed in a first slot. The slave graphics adapter 560 is coupled to the connection 541 when installed in a second slot. In some embodiments, additional graphics adapters may be installed in additional slots and the bridge 535 may provide an interface for each additional slot. The master graphics adapter 540 and secondary graphics adapter 560 may each include one or more graphics processors and dedicated memory which may be used to store graphics data, such as texture maps, image data, and program instructions.

A primary connection between the master graphics adapter 540 and one or more slave graphics adapters 560 may be provided by the interfaces via the bridge 535. In some embodiments, the primary connection couples the master graphics adapter 540 and one or more slave graphics adapters 560 through the bridge 535, chipset 530, and main memory 510 and data transfers between the master graphics adapter 540 and the one or more slave graphics adapters 560 are controlled by the host processor 550.

A dedicated interface 545 provides a secondary connection between the master graphics adapter 540 and one or more slave graphics adapters 560. The secondary connection is used to transfer pixel data produced by the slave graphics adapter 560 from the slave graphics adapter 560 to the master graphics adapter 540, thereby offloading pixel data transfers from the primary connection.

Using the dedicated interface 545 between two or more graphics adapters facilitates efficient transfer of graphics data and synchronization signals between the two or more graphics adapters while reducing system bandwidth. Furthermore, users can easily install each graphics adapter as desired to improve rendering performance in terms of image quality or rendering speed. For example, two or more graphics adapters may be used to render images with improved image quality or two or more graphics adapters may be used to render images at a higher frame rate.

The dedicated interface 545 between the master graphics adapter 540 and slave graphics adapter 560 is provided by a connection device. The connection device may be a connector PCB with a socket affixed to opposing ends of the connector PCB. Conductive traces fabricated as part of the connector PCB directly connect pins of the socket on one end of the connector PCB to pins of the other socket on the opposing end of the connector PCB.

Another embodiment of a connection device includes a connector flexible cable with a socket affixed to each end of the connector flexible cable. The connector flexible cable includes wires within a flexible insulating wrapping that directly connect pins of one socket on one end of the connector flexible cable to pins of the other socket on the opposing end of the connector flexible cable. Those skilled in the art will recognize that other components and mechanisms may be employed to produce a connection device.

The dedicated interface 545 provides a multi-bit connection for several signals. For example, pixel data may be transferred from a slave graphics device to a master graphics device or to another slave graphics device using a number of single bit connections for data, a data valid signal, and a clock. The master graphics device outputs image data directly to a display device. In contrast, a slave graphics device outputs pixel data to a master graphics device, sometimes through another slave graphics device. The pixel data and data valid may be transferred on one or both edges of the clock.

One or more buffer management signals may also be connected between graphics adapters using the connection device. In some embodiments of the present invention, a buffer management signal indicates when all of the graphics processors producing pixel data for a display should swap buffers, i.e., swap the back buffer with the front buffer. Synchronization signals may also be transferred from a master graphics device to a slave graphics device to communicate the display raster position.

The master graphics adapter 540 outputs image data to a display device (e.g. the display 570). Examples of display devices known in the art include a cathode ray tube (CRT), flat panel display, or the like. The slave graphics adapter 560 may process a larger portion of an image than the master graphics adapter 540 and transfer pixel data for the larger portion of the image to the master graphics adapter 540 via the dedicated interface 545.

In some embodiments, processing of the image may be distributed between the master graphics adapter 540 and one or more slave graphics adapters 560 based on the processing capability of each graphics adapter. Furthermore, a buffer swap and synchronization signals, e.g., horizontal sync, and vertical sync, may be transferred between the slave graphics adapter 560 and the primary graphics adapter 540 using the dedicated interface 545.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining whether a plurality of sub-devices of a single device are operating in a first mode or a second mode;
   in response to a determination that the plurality of sub-devices are operating in the first mode:
      exposing the single device including the plurality of sub-devices to an application, utilizing a driver and a processor, such that the application perceives the plurality of sub-devices as the single device,
      receiving a request from the application for state information associated with the single device, and
      in response to the request for the state information associated with the single device, providing the state information associated with the single device to the application: and
   in response to a determination that the plurality of sub-devices are operating in the second mode:
      exposing each of the sub-devices of the single device to the application, utilizing the driver and the processor, such that the application perceives each of the sub-devices individually and addresses the sub-devices individually,
      receiving a request from the application for state information associated with a least one of the sub-devices, and
      in response to the request for the state information associated with the at least one of the sub-devices, providing the state information associated with the at least one of the sub-devices to the application.

2. The method as recited in claim 1, wherein each of the sub-devices is a separate graphics processor.

3. The method as recited in claim 1, and further comprising receiving a request from the application for additional state information for a sub-device of another device.

4. The method as recited in claim 3, and further comprising providing the additional state information to the application, in response to the request.

5. The method as recited in claim 4, wherein the additional state information is associated with the device, if the device includes only one sub-device.

6. The method as recited in claim 1, wherein the state information includes performance information.

7. The method as recited in claim 1, wherein the state information includes temperature information, 8. The method as recited in claim 1, wherein the state information includes power information.

9. The method as recited in claim 1, wherein the first mode includes a first sub-device serving as a slave to a second sub-device.

10. The method as recited in claim 9, wherein the second mode includes the first sub-device operating independently of the second sub-device.

11. The method as recited in claim 10, wherein the state information associated with the at least one of the sub-devices is provided to the application independent of whether the sub-devices are operating in the first mode and the second mode.

12. The method as recited in claim 1, and further comprising determining a number of devices.

13. The method as recited in claim 12, and further comprising allocating the devices.

14. The method as recited in claim 13, and further comprising determining a number of the plurality of sub-devices.

15. The method as recited in claim 14, and further comprising allocating the plurality of sub-devices.

16. The method as recited in claim 1, wherein the receiving and the providing are performed utilizing the driver.

17. The method as recited in claim 1, wherein the single device includes a single motherboard.

18. The method as recited in claim 1, wherein the state information refers to performance information.

19. The method as recited in claim l, wherein the request for state information associated with the at least one of the sub-devices includes a request for the state information from a specific sub-device.

20. The method as recited in claim 1, further comprising in response to the request for the state information associated with the single device, determining an identifier for each of the sub-devices.

21. The method as recited in claim 20, wherein each identifier is utilized to reference the associated sub-device when making future requests for state information.

22. The method as recited in claim 1, wherein the state information associated with the single device which is provided to the application in response to the request for the state information associated with the single device when the plurality of sub-devices are operating in the first mode is the same as the state information associated with the at least one of the sub-devices which is provided to the application in response to the request for the state information associated with the at least one of the sub-devices when the plurality of sub-devices are operating in the second mode.

23. The method as recited in claim 1, wherein the request from the application for the state information associated with the single device when the plurality of sub-devices are operating in the first mode is the same as the request from the application for the state information associated with the at least one of the sub-devices when the plurality of sub-devices are operating in the second mode, and the request for the state information associated with the single device is valid while the request for the state information associated with the at least one of the sub-devices is invalid if the at least one of the sub-devices does not include a component associated with the request for the state information.

24. A computer program product embodied on a tangible computer readable medium, comprising:
   driver computer code for determining whether a plurality of sub-devices of a single device are operating in a first mode or a second mode;
   driver computer code for, in response to a determination that the plurality of sub-devices are operating in the first mode:
      exposing the single device including the plurality of sub-devices to an application, utilizing a processor, such that the application perceives the plurality of sub-devices as the single device,
      receiving a request from the application for state information associated with the single device, and
      in response to the request for the state information associated with the single device, providing the state information associated with the single device to the application: and
   driver computer code for, in response to a determination that the plurality of sub-devices are operating in the second mode:
      exposing each of the sub-devices of the single device to the application, utilizing the processor, such that the application perceives each of the sub-devices individually and addresses the sub-devices individually,
      receiving a request from the application for state information associated with at least one of the sub-devices, and
      in response to the request for the state information associated with the at least one of the sub-devices, providing the state information associated with the at least one of the sub-devices to the application.

25. A system, comprising:
   a processor;
   a plurality of graphics processors organized as a single device and a plurality of sub-devices of the single device; and
   a driver for exposing each of the sub-devices of the single device to an application, utilizing the processor;
   wherein the system is operable such that, in response to a determination that the plurality of sub-devices are operating in a first mode:
      the single device including the plurality of sub-devices is exposed to the application, utilizing the driver and the processor, such that the application perceives the plurality of sub-devices as the single device,
      the single device receives a request from the application for state information associated with the single device, and
      in response to the request for the state information associated with the single device, the state information associated with the single device is provided to the application;
   wherein the system is operable such that, in response to a determination that the plurality of sub-devices are operating in a second mode:
      each of the sub-devices of the single device is exposed to the application, utilizing the driver and the processor, such that the application perceives each of the sub-devices individually and addresses the sub-devices individually,
      at least one of the sub-devices receives a request from the application for state information associated with the at least one of the sub-devices, and
      in response to the request for the state information associated with the at least one of the sub-devices, the state information associated with the at least one of the sub-devices is provided to the application.

26. The system as recited in claim 25, wherein the graphics processors are in communication with a display and a central processing unit via a bus.

27. The system as recited in claim 25, wherein each graphics processor includes a graphics processing unit.

* * * * *

UNITED STATES PATENT AND TRADEMARK OFFICE
CERTIFICATE OF CORRECTION

PATENT NO. : 8,126,993 B2
APPLICATION NO. : 11/489352
DATED : February 28, 2012
INVENTOR(S) : Carraher et al.

It is certified that error appears in the above-identified patent and that said Letters Patent is hereby corrected as shown below:

In the Claims:
Column 6, Claim 1, lines 37-38; please replace "application:" with --application;--;
Column 6, Claim 1, line 47; please replace "a" with --at--;
Column 6, Claim 7, line 67; please replace "information," with --information.--;
Column 7, Claim 19, line 28; please replace "l," with --1,--;
Column 8, Claim 24, lines 9-10; please replace "application:" with --application;--.

Signed and Sealed this
Tenth Day of July, 2012

David J. Kappos
*Director of the United States Patent and Trademark Office*